US010560587B2

(12) United States Patent
Latheef et al.

(10) Patent No.: US 10,560,587 B2
(45) Date of Patent: *Feb. 11, 2020

(54) LIFI ENABLED GUARD SECURITY SYSTEM

(71) Applicant: Honeywell International Inc., Morris Plains, NJ (US)

(72) Inventors: Rinas Puthuveetil Abdul Latheef, Mannarkkad (IN); Aravindan Cheruvally, Cochin (IN); Jareesh Myladan, Mandurai (IN); Ranjit Mathew Kumaracheril, Kochi (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,608

(22) Filed: Aug. 22, 2019

(65) Prior Publication Data

US 2019/0387106 A1 Dec. 19, 2019

Related U.S. Application Data

(63) Continuation of application No. 15/618,065, filed on Jun. 8, 2017.

(51) Int. Cl.
*H04N 1/00* (2006.01)
*G08B 25/01* (2006.01)
(Continued)

(52) U.S. Cl.
CPC ....... *H04N 1/00116* (2013.01); *G06F 3/0488* (2013.01); *G08B 13/1966* (2013.01);
(Continued)

(58) Field of Classification Search
CPC . H04N 5/23293; H04N 5/23216; H04N 7/185
See application file for complete search history.

(56) References Cited

U.S. PATENT DOCUMENTS 5,572,183 A 11/1996 Sweeney
7,497,019 B2 3/2009 Nash et al.
(Continued)

FOREIGN PATENT DOCUMENTS

CN 103617655 A 3/2014
GB 2424778 A 10/2008
(Continued)

OTHER PUBLICATIONS

Burchardt et al., "VLC: Beyond Point-to-Point Communication," 24 pages, Nov. 1, 2013.
(Continued)

*Primary Examiner* — Christopher K Peterson
(74) *Attorney, Agent, or Firm* — Seager Tufte & Wickhem LLP

(57) ABSTRACT

A portable security device may enable a security guard to quietly and unobtrusively solicit assistance, or transmit information, when desired. A portable security device may include a user interface, a LiFi source and a controller that is operatively coupled to the user interface and to the LiFi source. In some cases, the controller may be configured to present two or more alert options to the security guard via the user interface and to receive a selection of one of the alert options by the security guard. In response to the selection of an alert option by the security guard, the controller may be configured to transmit a LiFi message that corresponds to the selected alert option via the LiFi source.

20 Claims, 6 Drawing Sheets

(51) Int. Cl.
*G06F 3/0488* (2013.01)
*G08B 13/196* (2006.01)
*H04N 7/18* (2006.01)
*H04N 5/232* (2006.01)

(52) U.S. Cl.
CPC ....... *G08B 25/016* (2013.01); *H04N 1/00111* (2013.01); *H04N 5/23216* (2013.01); *H04N 5/23293* (2013.01); *H04N 7/185* (2013.01)

(56) References Cited

U.S. PATENT DOCUMENTS

| | | |
|---|---|---|
| 7,626,507 B2 | 12/2009 | LaCasse |
| 7,970,537 B2 | 6/2011 | Ann et al. |
| 8,104,672 B2 | 1/2012 | Mitchell, Jr. et al. |
| 8,866,391 B2 | 10/2014 | Ganick et al. |
| 9,107,039 B2 | 8/2015 | Bae et al. |
| 9,270,627 B1 | 2/2016 | Koo |
| 9,424,699 B2 | 8/2016 | Kusens et al. |
| 2008/0281515 A1 | 11/2008 | Ann et al. |
| 2010/0207724 A1 | 8/2010 | Morii |
| 2014/0089406 A1 | 3/2014 | Gniffke et al. |
| 2015/0037039 A1 | 2/2015 | Chang |
| 2015/0229391 A1 | 8/2015 | Choi et al. |
| 2015/0318922 A1 | 11/2015 | Poola et al. |
| 2016/0098676 A1 | 4/2016 | Kusens et al. |
| 2016/0218807 A1 | 7/2016 | Tran |
| 2016/0247342 A1 | 8/2016 | Kusens et al. |
| 2016/0316154 A1 | 10/2016 | Elmfors et al. |
| 2017/0352257 A1 | 12/2017 | Oliver et al. |
| 2018/0011983 A1 | 1/2018 | Zuhars et al. |
| 2018/0359374 A1* | 12/2018 | Latheef ................ G08B 25/016 |

FOREIGN PATENT DOCUMENTS

| | | |
|---|---|---|
| JP | 4825820 B2 | 11/2011 |
| WO | 2016126585 A1 | 8/2016 |

OTHER PUBLICATIONS https://en.wikipedia.org/wiki/Li-Fi, "Li-Fi—Wikipedia, the Free Encyclopedia," 5 pages, printed Sep. 22, 2016.

Khairi et al., "Li-Fi the Future of Vehicular Ad hoc Networks," Transactions on Networks and Communications, vol. 3, Issue 3, Jun. 2, 2015.

Kim et al., "Smart Parking Information System Exploiting Visible Light Communication," International Journal of Smart Home, vol. 8, No. 1, pp. 251-260, 2014.

Yamazato et al., "Image-Sensor-Based Visible Light Communication for Automotive Applications," IEEE Communications Magazine, pp. 88-97, Jul. 2014.

Canadian application No. 3,004,217, Office Action, pp. 4, dated Mar. 6, 2019.

* cited by examiner

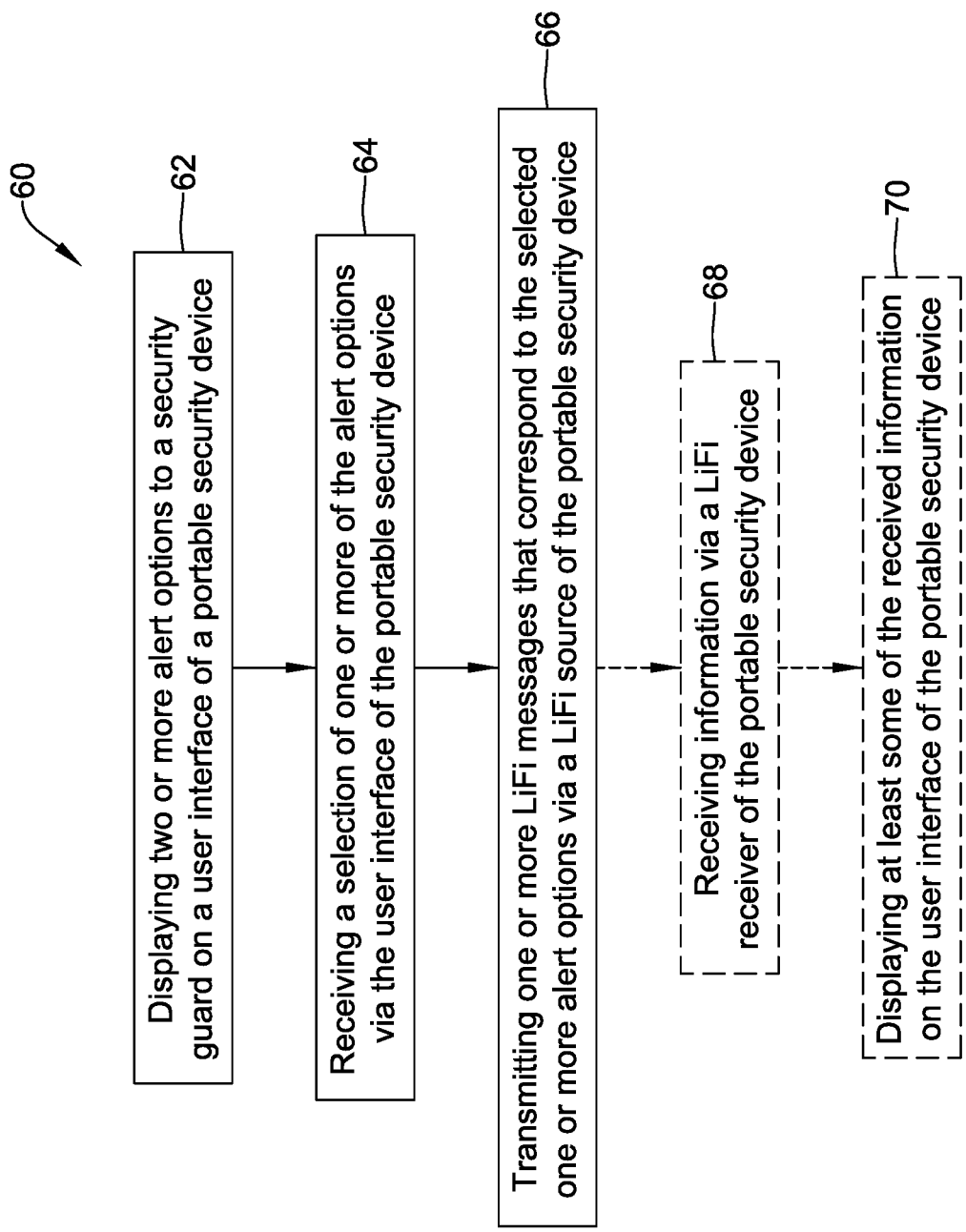

ated Jun. 8, 2017,
LIFI ENABLED GUARD SECURITY SYSTEM

This application is a continuation of co-pending U.S. patent application Ser. No. 15/618,065, filed Jun. 8, 2017, which is incorporated herein by reference.

TECHNICAL FIELD

The present disclosure pertains to security systems and more particularly to portable security devices that may be used by a security guard or the like touring a space.

BACKGROUND

There are many situations in which a security guard makes rounds when monitoring activity within a building or an exterior location such as a park. In some instances, the security guard may periodically check in while making their rounds. This can involve a guard periodically swiping an access card in a card reader, for example. The security guard may come across a situation that may require additional assistance. In some cases, the security guard may use a phone or walkie-talkie to call for assistance. In some instances, however, there may be a desire for the security guard to be able to quietly call for assistance, for example, without alerting intruders or the like. A need remains for a portable security device that can be carried by a security guard and can quietly, unobtrusively and reliably communicate information and/or solicit assistance. A need also remains for a portable security device that can automatically check-in at predetermined locations while the security guard makes his/her rounds.

SUMMARY

The present disclosure pertains generally to security systems and more particularly to portable security devices that may be used by a security guard touring a space. In an example of the disclosure, a portable security device may enable a security guard to quietly, unobtrusively and reliably communicate information and/or solicit assistance, and in some cases, automatically check-in at predetermined locations while the security guard makes his/her rounds.

In a particular example of the disclosure, a portable security device for use by a security guard touring a space may include a user interface, a LiFi (Light Fidelity) source and a controller that is operatively coupled to the user interface and to the LiFi source. In some cases, the controller may be configured to present two or more alert options to the security guard via the user interface and to receive a selection of one of the alert options from the security guard. In response to the selection of an alert option by the security guard, the controller may be configured to transmit a LiFi message that corresponds to the selected alert option via the LiFi source.

In another example of the disclosure, a portable security device for use by a security guard touring a space may include a user interface, a LiFi source and a controller that is operatively coupled to the user interface and to the LiFi source. In some cases, the controller may be configured to receive input from the security guard via the user interface and, in response to receiving the input from the portable security guard, transmit a LiFi message that corresponds to the received input via the LiFi source.

In another example of the disclosure, a method may include displaying two or more alert options to a security guard on a user interface of a portable security device, receiving a selection of one or more of the alert options via the user interface of the portable security device and transmitting one or more LiFi messages that correspond to the selected one or more alert options via a LiFi source of the portable security device.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIG. 6 is a flow diagram of an illustrative method in accordance with the disclosure;

Figure 1:
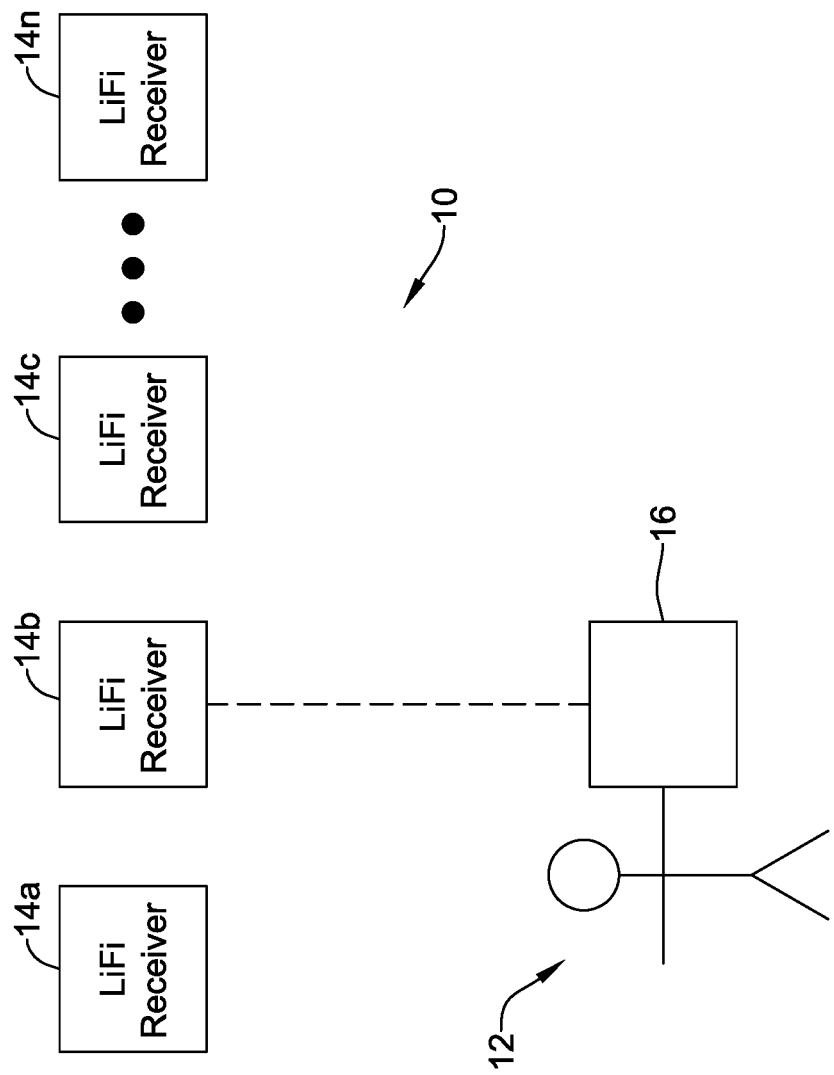
FIG. 1 is a schematic diagram of a security guard touring a space, the space equipped with a plurality of LiFi receivers in accordance with the disclosure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic diagram of a space 10 that may, for example, correspond to an area that may be patrolled by a security guard 12. In some cases, the space 10 may correspond to a building or a series of buildings. In some cases, the space 10 may correspond to a park, a parking lot, a sports stadium, or the like. The space 10 may include a number of LiFi receivers 14a, 14b, 14c through 14n, where n is an integer denoting a total number of LiFi receivers. In some cases, the LiFi receivers 14a, 14b, 14c through 14n may be mounted to walls or other vertical surfaces within a building. In some cases, the LiFi receivers 14a, 14b, 14c through 14n may be mounted onto a fence, or on light posts if the space 10 is an outdoor space, for example. In some cases, at least some of the LiFi receivers 14a, 14b, 14c through 14n may be built into visible light sources. In some cases, at least some of the LiFi receivers 14a, 14b, 14c through 14n may also include a LiFi source (not illustrated), such that information may be transmitted from as well as received by the LiFi receivers 14a, 14b, 14c through 14n to support bi-directional communication.

In some cases, the LiFi receivers 14a, 14b, 14c through 14n may include sensors that are sensitive to modulated light. In some cases, as will be discussed, a light source may include a portable light source that is configured to be modulated in order to transmit data. In FIG. 1, a security guard 12 can be seen holding a portable security device 16. In some cases, as will be discussed, the portable security device 16 may include a light source that is configured to be modulated at high rates of speed in order to transmit information to the LiFi receivers 14a, 14b, 14c through 14n that are within range. In some cases, the light source may include one or more light emitting diodes (LEDs). In some cases, the light source may be a visible light source. In some cases, the light source may be an ultraviolet (UV) light source or an infrared (IR) light source. In some cases, the light source may be a multi-band light source that operates in two or more bands, such as two or more of the visible light band, the UV light band, and the IR light band. In some cases, one band, such as the visible light band, may be used for illumination while another band may be used for communication. In some cases, one band, such as the visible light band, may be used for both illumination and communication.

In some cases, the light source may be configured so that the light emanating from the light source, or at least particular wavelengths of the light emanating from the light source, may be modulated at a rate that can be used to transmit information. In some cases, the light source may be considered as being a LiFi (Light Fidelity) light source. LiFi can be implemented as a unidirectional, high speed communication link, or a bidirectional, high-speed and fully networked wireless communication link that is similar in functionality to WiFi. In some cases, LiFi may provide higher bandwidth relative to other wireless communication technologies including WiFi. LiFi may also provide a higher level of security relative to other wireless communication technologies, including WiFi, since LiFi typically requires closer proximity and often line-of-sight access. Also, LiFi is light based and is thus less susceptible to electronic jamming.

As will be discussed with respect to subsequent Figures, the portable security device 16 may be configured to enable the security guard 12 to communicate information to at least one of the LiFi receivers 14a, 14, 14c through 14n. In some cases, the portable security device 16 may periodically transmit identifying information that may be received by whichever of the LiFi receivers 14a, 14b, 14c through 14n that is/are within range of the portable security device 16. For example, the identifying information may include a code that uniquely identifies the portable security device 16 and/or perhaps a biometric code that uniquely identifies the security guard 12. While FIG. 1 shows the security guard 12 holding the portable security device 16, in some cases the portable security device 16 may be worn on a uniform like a patch, or may be worn around the neck on a lanyard. In some cases, the portable security device 16 may be built into a flashlight or similar device. In some cases, the portable security device 16 may be used to transmit one or several alert messages to one of the LiFi receivers 14a, 14b, 14c through 14n, for example.

Figure 2:
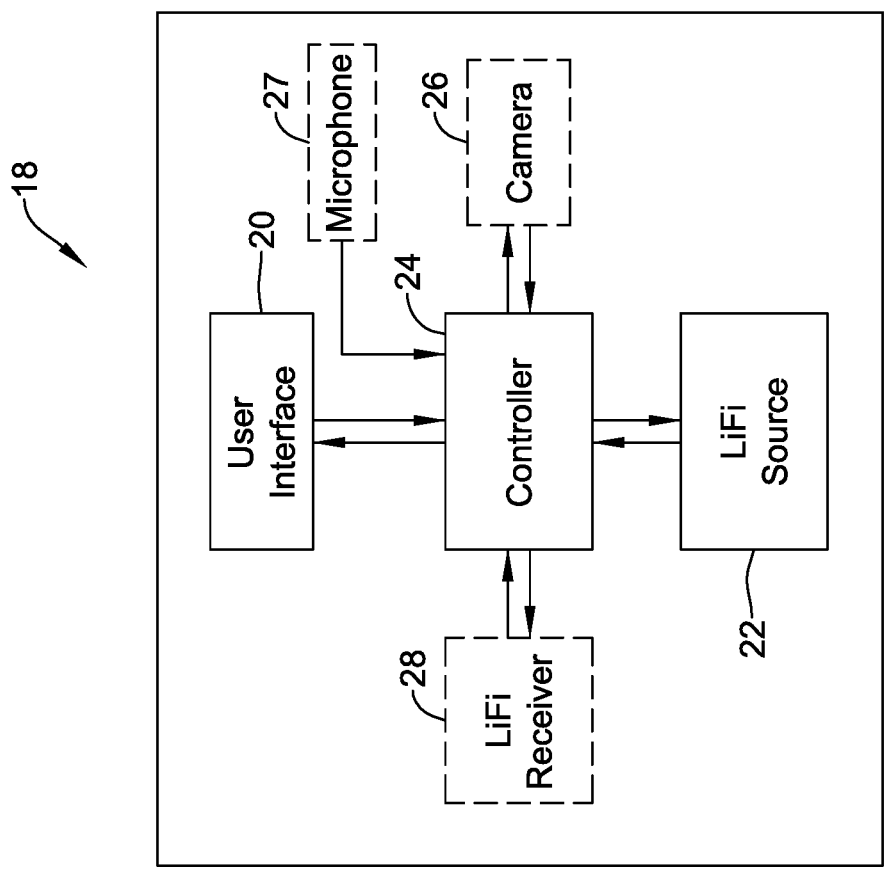
FIG. 2 is a schematic diagram of an illustrative portable security device usable by the security guard of FIG. 1 in accordance with the disclosure.

FIG. 2 is a schematic block diagram of an illustrative portable security device 18 that may, for example, be considered as being an example of the portable security device 16 shown in FIG. 1. The portable security device 18 may, for example, be hand-held so that the security guard 12 may aim it when desired. The portable security device 18 includes a user interface 20, a LiFi source 22 and a controller 24 that is operably coupled to the user interface 20 and to the LiFi source 22. The user interface 20 may be configured to display information to be read by the security guard 12 as well as to accept inputs from the security guard 12. The user interface 20 may include a mechanical interface. In some cases, the user interface 20 may for example be a touch screen display.

In some cases, the controller 24 may be configured to receive input from the security guard 12 via the user interface 20, and in response to receiving the input from the security guard 12, to transmit a LiFi message that corresponds to the received input via the LiFi source 22. In some cases, the portable security device 18 may include a camera 26 that may be a still camera or a video camera. Images or video from the camera 26 may be stored in a memory of the controller 24 to document that the guard performed his rounds and/or the conditions in the space during the rounds. The images and/or video may be time stamped. In some instances, the received input from the security guard 12 may include a command to transmit a photo or a video from the camera 26 via the LiFi source 22. In some cases, a photo and/or a video may be transmitted via the LiFi source 22 in real time or near real time.

In some cases, the portable security device 18 may include a microphone 27 that may capture audio. The captured audio from the microphone 27 may be stored in a memory of the controller 24 to document the conditions in the space during the rounds. The captured audio may be time stamped. In some instances, the received input from the security guard 12 may include a command to transmit the audio from the microphone 27 via the LiFi source 22. In some cases, the audio may be transmitted via the LiFi source 22 in real time or near real time.

In some cases, the portable security device 18 may include a LiFi receiver 28 for receiving information from a remote LiFi source. In some cases, the LiFi receivers 14a, 14, 14c through 14n may each include a suitable LiFi source.

In some instances, the controller 24 may be configured to display at least some of the received information on the user interface 20.

In some cases, the controller 24 may be configured to present two or more predefined alert options to the security guard 12 via the user interface 20. The controller 24 may accept selection of one of the alert options from the security guard 12 via the user interface 20, and in response transmit a LiFi message via the LiFi source 22 that corresponds to the selected alert option. In some cases, the LiFi message may include a text based message that includes a description of an observed event or incident. In some cases, the LiFi message may include an image from the camera 26. In some cases, when the camera 26 is a video camera, the transmitted message may include a recorded or live video from the camera 26. In some cases, the LiFi message may include recorded or live audio from the microphone 27. The LiFi message may be received by one or more of the LiFi receivers 14a, 14, 14c through 14n, which may identify an approximate location of the reported event or incident within the space.

In some cases, a first one of the alert options may correspond to a first type of incident and a second one of the alert options may correspond to a second type of incident that is different from the first type of incident. For example, the alert options may include "An intruder was/is seen", "An unusual noise was/is heard", "A security gate was found open", "A light was found on that should not be on", "Smoke is observed", "A water leak is observed", and "A gas leak is observed". These are just some examples. In some cases, the LiFi message transmitted by the LiFi source 22 may be encrypted. In some cases, the LiFi message transmitted by the LiFi source 22 may include text and/or audio and/or video. In some cases, the LiFi message transmitted by the LiFi source 22 may, for example, convey a severity level of the corresponding alert from two or more different available severity levels. The security level may be pre-defined based on the alert option selected by the security guard, or may be separately selected by the security guard depending on the observed conditions on the ground.

Figure 3:
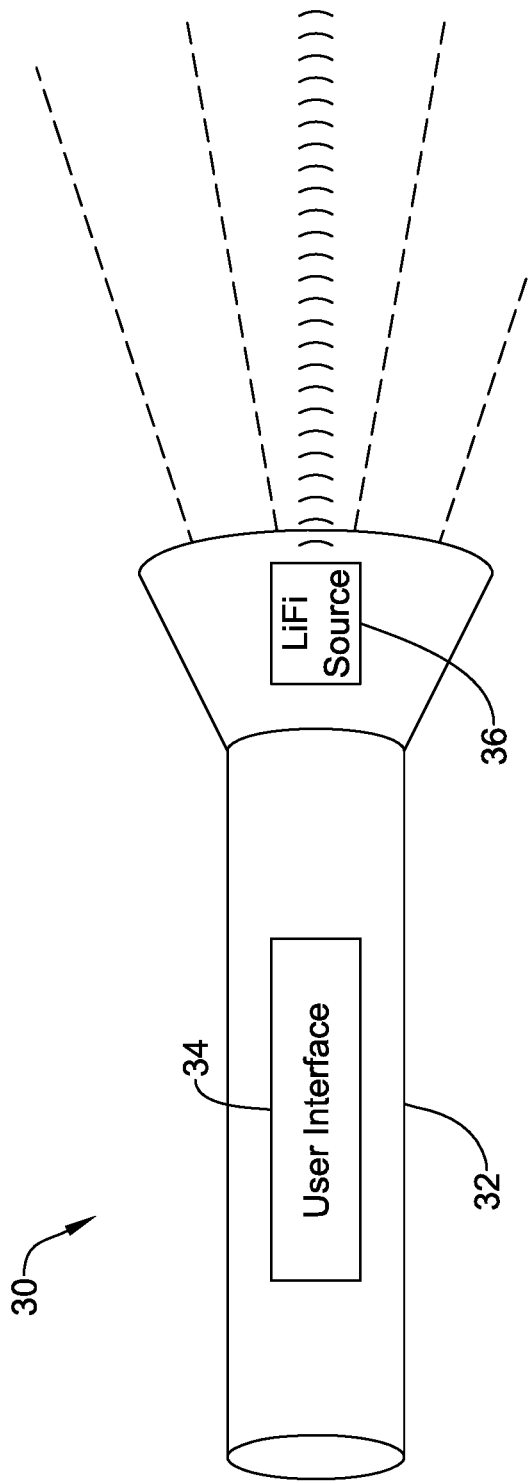
FIG. 3 is a schematic diagram of an illustrative portable security device usable by the security guard of FIG. 1 in accordance with the disclosure.

FIG. 3 is a schematic view of another illustrative portable security device 30 that may be considered as being an example of the portable security device 16 (FIG. 1) or the portable security device 18 (FIG. 2). In this example, the portable security device 30 is built into the body of a flashlight 32. This enables the security guard 12 to utilize the portable security device 30 as a portable light source, but also enables the security guard 12 to point the portable security device 30 at a particular LiFi receiver such as one of the LiFi receivers 14a, 14b, 14c through 14n shown in FIG. 1 in order to transmit a message from the portable security device 30 such as but not limited to an alert message. The illustrative portable security device 30 includes a user interface 34 that enables alert messages to be displayed for selection by the security guard 12. In some cases, the user interface 34 may include a key board that allows the security guard 12 to type in a custom message describing the incident and/or conditions. The illustrative portable security device 30 may also include a LiFi source 36 that is configured to transmit alert messages and other information as desired. The illustrative portable security device 30 may also transmit via the LiFi source 36 a check-in signal to automatically check-in at predetermined locations, such as at each of the LiFi receivers 14a, 14b, 14c through 14n shown in FIG. 1, while the security guard makes his/her rounds. It will be appreciated that while not illustrated, the portable security device 30 may include additional components such as a controller, power source, camera, microphone and the like.

Figure 4:
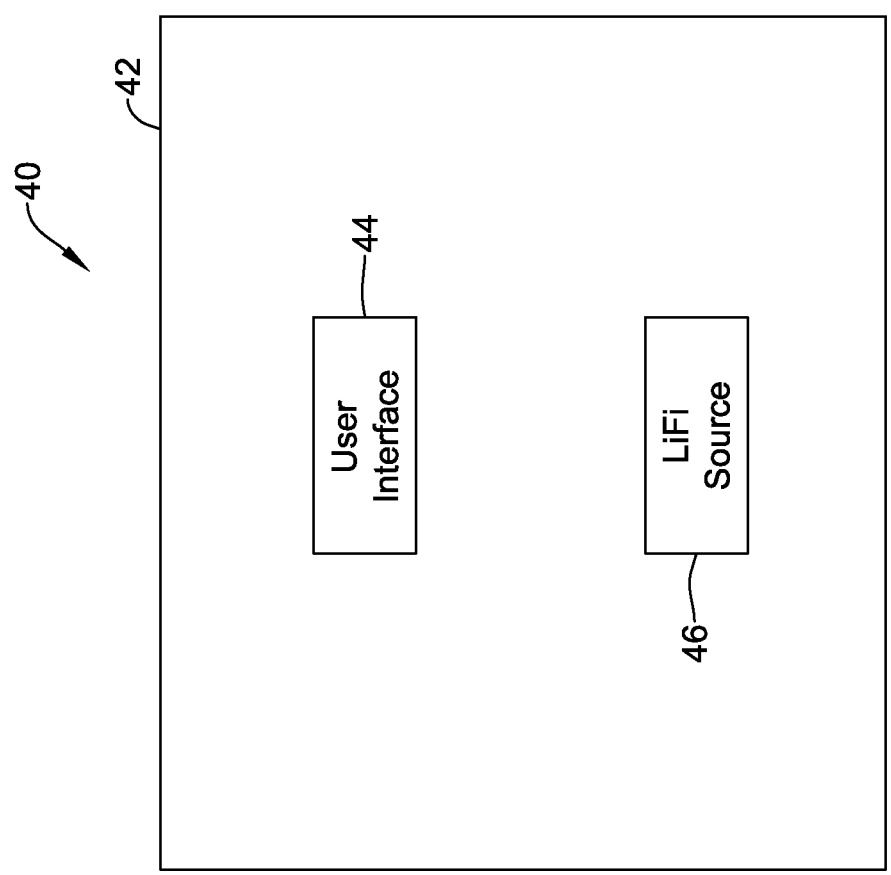
FIG. 4 is a schematic diagram of an illustrative portable security device usable by the security guard of FIG. 1 in accordance with the disclosure.

FIG. 4 is a schematic view of an illustrative portable security device 40 that may be considered as being an example of the portable security device 16 (FIG. 1) or the portable security device 18 (FIG. 2). In this example, the portable security device 16 is built into a badge 42 that may be secured to a uniform of a security guard 12, or secured to a lanyard that the security guard 12 may wear around their neck. The illustrative portable security device 40 includes a user interface 44 that enables alert messages to be displayed for selection by the security guard 12, for example, as well as a LiFi source 46 that is configured to transmit alert messages and other information as desired. The illustrative portable security device 40 may also transmit via the LiFi source 46 a check-in signal to automatically check-in at predetermined locations, such as at each of the LiFi receivers 14a, 14b, 14c through 14n shown in FIG. 1, while the security guard makes his/her rounds. It will be appreciated that while not illustrated, the portable security device 40 may include additional components such as a controller, power source, camera, microphone and the like.

Figure 5:
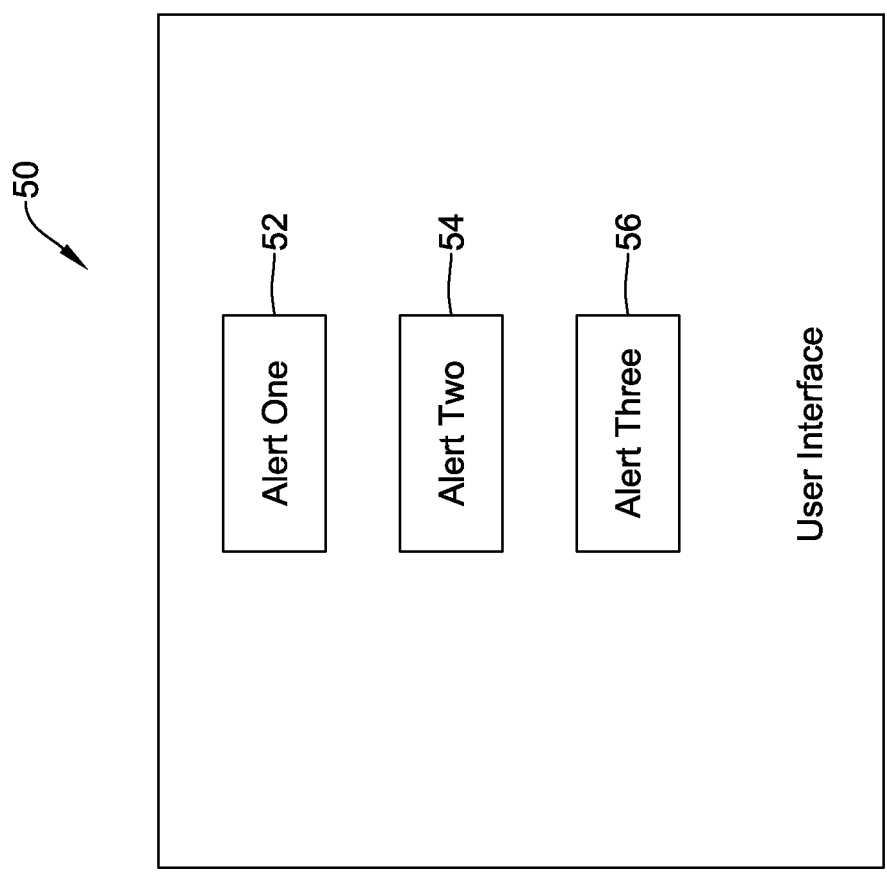
FIG. 5 is a schematic diagram of an illustrative user interface forming a portion of any of the portable security devices of FIGS. 2 through 4 in accordance with the disclosure.

FIG. 5 is a schematic view of an illustrative user interface 50 that may be considered as being an example of the user interface 20 (FIG. 2), the user interface 34 (FIG. 3) and/or the user interface 44 (FIG. 4). In some cases, the user interface 50 is a touch screen display that is able to display information as well as accept selections of the displayed information. As shown, the user interface 50 is displaying an ALERT ONE button 52, an ALERT TWO button 54 and an ALERT THREE button 56. It will be appreciated that these are generic alert descriptions intended to represent any of a variety of different alert situations. For example, the ALERT ONE button 52 may correspond to a possible intruder. The ALERT TWO button 54 may correspond to a possible medical emergency. The ALERT THREE button 56 may correspond to a possible fire. These are merely examples. In some cases, for example, once the security guard 12 selects on the ALERT buttons 52, 54, 56, the user interface 50 may then display additional menu options, such as allowing the security guard 12 to indicate a relative severity level of the possible situation, or to further specify the type of possible help that might be useful. In some cases, the user interface 34 may also include a key board (not shown) to allow the security guard 12 to type in a custom message describing the incident and/or observed conditions.

FIG. 6 is a flow diagram showing a method 60 that may be carried out. In the example method 60, two or more alert options are displayed to a security guard on a user interface of a portable security device, as generally indicated at block 62. As seen at block 64, selection of one or more of the alert options may be received via the user interface of the portable security device. One or more LiFi messages may be transmitted that correspond to the selected one or more alert options via a LiFi source of the portable security device, as indicated at block 66. In some cases, information may be received via a LiFi receiver of the portable security device as indicated at block 68. As shown at block 70, at least some of the received information may be displayed on the user interface of the portable security device. The received information may, for example, direct the security guard to a particular location, may alert the security guard to a detected incident and details about the detected incident, and/or may provide other information.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A portable security device for use by a person touring a space, the portable security device comprising:
   a user interface;
   a modulating light source; and
   a controller operatively coupled to the user interface and the modulating light source, the controller configured to:
      present two or more alert options to the person via the user interface each corresponding to a different event or incident that may be encountered by the person while the person is touring the space;
      receive a selection of one of the alert options by the person in response to the person encountering the corresponding event or incident while the person is touring the space; and
      after the selection of an alert option by the person, transmit a message that corresponds to the selected alert option by modulating the modulating light source to notify a security system of the encountered event or incident.

2. The portable security device of claim 1 further comprising a camera, wherein with the selection of at least one of the alert options by the person, the message includes an image from the camera.

3. The portable security device of claim 2, wherein the camera is a video camera, and wherein with the selection of at least one of the alert options by the person, the message includes a video from the video camera.

4. The portable security device of claim 3, wherein the message that includes the video from the video camera includes a live video from the video camera.

5. The portable security device of claim 3, wherein the message that includes the video from the video camera includes a recorded video from the video camera.

6. The portable security device of claim 1, wherein a first one of the alert options corresponds to a first type of event or incident and a second one of the alert options corresponds to a second type of event or incident, wherein the first type of event or incident is different from the second type of event or incident.

7. The portable security device of claim 1, wherein the message is encrypted.

8. The portable security device of claim 1, wherein the message comprises a code that uniquely identifies the portable security device.

9. The portable security device of claim 1, wherein the message comprises a biometric code that uniquely identifies the person.

10. The portable security device of claim 1, wherein the message comprises text and/or audio.

11. The portable security device of claim 1, wherein the message is transmitted using Visible Light Communication (VLC).

12. The portable security device of claim 1, wherein the message is transmitted using LiFi communication.

13. The portable security device of claim 1, wherein the message conveys a severity level of the corresponding alert option from two or more different available severity levels.

14. The portable security device of claim 1, wherein the portable security device is configured to be handheld such that the person can point the modulating light source at a remote light receiver located in the space.

15. The portable security device of claim 1, further comprising a LiFi receiver for receiving information from a remote LiFi source, and wherein the controller is configured to display at least some of the received information on the user interface of the portable security device.

16. A portable security device built into a flashlight for use by a person moving about, the portable security device serving as a portable light source, the portable security device comprising:
   a user interface;
   a modulating light source; and
   a controller operatively coupled to the user interface and the modulating light source, the controller configured to:
      receive an input from the person via the user interface in response to the person encountering an event or incident while the person is moving about; and
      after receiving the input from the person, transmit a message that corresponds to the received input by modulating the modulating light source to notify a remote security system of the encountered event or incident.

17. The portable security device of claim 16 further comprising a video camera, wherein the received input from the person comprises a command to transmit a video from the video camera via the modulating light source.

18. The portable security device of claim 16, further comprising a light receiver for receiving information from a remote modulating light source, and wherein the controller is configured to display at least some of the received information on the user interface of the portable security device.

19. A method comprising:
   displaying two or more alert options to a person on a user interface of a portable security device each corresponding to a different event or incident;
   receiving a selection of one or more of the alert options via the user interface of the portable security device in response to the person encountering the corresponding event or incident;
   transmitting one or more messages that correspond to the selected one or more alert options via a modulating light source of the portable security device to notify a remote system of the encountered event or incident.

20. The method of claim 19, further comprising:
   receiving information via a light receiver of the portable security device; and
   displaying at least some of the received information on the user interface of the portable security device.

* * * * *